US012779903B2

(12) United States Patent
Drake

(10) Patent No.: US 12,779,903 B2
(45) Date of Patent: Nov. 3, 2026

(54) CENTRE-LOCK WHEEL REMOVAL TOOL

(71) Applicant: Gordon Murray Automotive Limited, Shalford (GB)

(72) Inventor: Mathew Drake, Guildford (GB)

(73) Assignee: Gordon Murray Automotive Limited, Shalford (GB)

( * ) Notice: Subject to any disclaimer, the term of this patent is extended or adjusted under 35 U.S.C. 154(b) by 262 days.

(21) Appl. No.: 18/708,406

(22) PCT Filed: Nov. 7, 2022

(86) PCT No.: PCT/EP2022/081006
§ 371 (c)(1),
(2) Date: May 8, 2024

(87) PCT Pub. No.: WO2023/079149
PCT Pub. Date: May 11, 2023

(65) Prior Publication Data

US 2025/0026148 A1 Jan. 23, 2025

(30) Foreign Application Priority Data

Nov. 8, 2021 (GB) ..................................... 2116025

(51) Int. Cl.
*B60B 29/00* (2006.01)
*B25B 13/48* (2006.01)
*B60B 3/14* (2006.01)

(52) U.S. Cl.
CPC .............. *B60B 29/00* (2013.01); *B60B 3/142* (2013.01); *B25B 13/48* (2013.01)

(58) Field of Classification Search
CPC ........... B60B 3/14; B60B 3/142; B60B 3/165; B60B 29/00; B25B 13/065; B25B 13/48; B25B 27/0035
See application file for complete search history.

(56) References Cited

U.S. PATENT DOCUMENTS 4,299,425 A * 11/1981 Renz ......................... B60B 7/14 301/114
9,073,387 B2 * 7/2015 Becker .................... B60B 3/142
(Continued)

FOREIGN PATENT DOCUMENTS

DE 10106140 A1 * 8/2002 ............. B60B 29/00
DE 102018007072 A1 3/2020
(Continued)

OTHER PUBLICATIONS

International Search Report and Written Opinion issued for PCT/EP2022/081006, dated Feb. 28, 2023.

*Primary Examiner* — Adam D Rogers
(74) *Attorney, Agent, or Firm* — Westman, Champlin & Koehler, P.A.; Z. Peter Sawicki

(57) ABSTRACT

Method and tool (46, 50) for removal of the locking element (42) from a centre-lock wheel hub with a wheel nut threadingly engaged with the wheel hub, where the locking element engages with the wheel hub (24) and with the wheel nut (26) thereby to prevent relative rotation of the wheel hub and the wheel nut. Removal is made easier by fitting an extraction apparatus (50) having a first end with an externally threaded section, threadingly engaged with a corresponding internal thread (56) of the locking element, a second end provided with an engagement element for imparting rotational torque to the extraction apparatus, and a bearing surface (60, 62), located radially outside the externally threaded section and axially displaced from the externally threaded section, contacting the wheel nut.

17 Claims, 7 Drawing Sheets

(56) References Cited

U.S. PATENT DOCUMENTS

| | | | | |
|---|---|---|---|---|
| 10,744,817 | B2 | 8/2020 | Chen et al. | |
| 10,946,693 | B2 | 3/2021 | Baumann | |
| 11,541,686 | B2 * | 1/2023 | Ivarsson | B60B 7/16 |
| 2024/0246358 | A1 * | 7/2024 | Sziedat | B60B 3/165 |
| 2025/0388045 | A1 * | 12/2025 | Confalonieri | B60B 3/142 |

FOREIGN PATENT DOCUMENTS

| | | | | |
|---|---|---|---|---|
| EP | 4129712 | A1 * | 2/2023 | B60B 3/165 |
| EP | 4647267 | A1 * | 11/2025 | B60B 3/142 |
| GB | 2493084 | A * | 1/2013 | B60B 3/165 |

* cited by examiner

CENTRE-LOCK WHEEL REMOVAL TOOL

CROSS-REFERENCE TO RELATED APPLICATION

This Application is a Section 371 National Stage Application of International Application No. PCT/EP2022/081006, filed Nov. 7, 2022 and published as WO2023/079149 on May 11, 2023, in English, which claims priority to GB patent application Serial No. 2116025.4, filed Nov. 8, 2021 the contents of which are hereby incorporated by reference in their entirety.

FIELD OF THE INVENTION

The present invention relates to a tool for removing centre-lock wheels (also known as center-lock wheels).

BACKGROUND ART

The wheels of a vehicle need to be removable to allow for servicing and repair tasks to be carried out, especially in relation to the vehicle braking system, and for replacement of the vehicle tyres. Such replacement is necessary from time to time due to wear, or in order to substitute different tyres with different properties such as winter/summer tyres or road/track tyres. Most road cars and vans use a five- or four-bolt system in which the wheel hub has threaded sockets distributed evenly in a pentagonal or square pattern around the facing surface against which the wheel is held; a set of wheel bolts pass through corresponding apertures in the wheel and are secured in the sockets. In some vehicles, the hub is provided with externally-threaded studs onto which the wheel is fitted, and wheel nuts are fixed onto the studs in order to retain the wheel in place.

This is a straightforward and generally-reliable approach. However, it requires a reasonable radial distance from the centre of the wheel to be set aside for the fixing mechanism, which limits the potential dimensions of the brake discs. Centre-lock wheels have a long history in a motorsport context since they can be removed and attached more quickly during pit stops as only one fixing needs to be operated per wheel, they allow hub designs with more space for large brake discs, and have greater strength when properly installed. Some automobile manufacturers and tuners therefore install centre-lock wheel and hub systems on road-going sports and performance cars in order to secure these advantages. Centre-lock wheels are in current usage by manufacturers such as Porsche, Koenigsegg and Lamborghini.

Centre-lock wheels employ a single nut per wheel that has a threaded engagement with the wheel hub at the centre of the wheel. Whilst referred to as a 'nut', it may be externally-threaded for engagement with an internal thread provided on the wheel hub, but the morphology of the element in question usually leads to it being described as a 'nut' and this usage will be employed herein. The obviously-apparent difficulty with a centre-lock wheel is of course that the wheel itself is rotating around the same axis as that of the nut which is retaining the wheel in place, and therefore there is a risk that the rotational motion of the wheel will unwind the nut leading to loss of the wheel.

Such a loss would be catastrophic. Precautions are therefore taken to ensure that this does not take place. A simple and straightforward precaution is to arrange that rotation of the wheel in a forward direction will tend to tighten rather than loosen the nut. This requires that one side of the vehicle has a conventional clockwise-tightening thread and the other side has a reverse or anticlockwise thread. It is also common for the hub to have an interlocking engagement mechanism of some sort between the wheel and the hub so that torque is not transmitted directly via the nut. Older race cars used a spline on the axle over which the wheel fitted, engaging via a corresponding spline on the interior of the wheel. Current Porsche sports cars provide protruding lugs on the wheel hub which project into corresponding recesses on the wheel.

Principally, however, modern centre-lock arrangements for road vehicles employ an externally-splined locking pin which bridges the nut and hub and engages with an internal spline on both so as to prevent relative rotation. The locking pin may have a single spline matching both the hub and the nut, or it may have a step between two splines, one that fits the hub and one that fits the nut. This is inserted into position after the wheel has been fitted and the nut has been torqued, and prevents relative rotation. To remove the wheel, the locking pin must be extracted so that the nut can be removed.

Porsche employ a spring-loaded retracting locking pin that forms part of the wheel hub, which is depressed into the hub by a special protrusion on a bespoke socket that fits the centre-lock nut; removal of the socket from the nut allows the locking pin to extend under its spring bias until it is in place with its spline bridging the nut and the hub; a mechanic must visually check that it has extended satisfactorily. Other centre-lock arrangements employ a pin which is inserted from the outside through the nut and into the wheel hub along the centre-line of both, engaging with both sets of splines. It can then be held in by friction or by a snap-fit cap.

Such an externally-inserted pin will need to be removed prior to loosening the wheel nut. However, it is ideally a tight fit, so as to prevent accidental ejection, and there may have been a small movement of the nut relative to the wheel hub leading to the locking pin being even more tightly engaged. Thus, a removal tool is usually provided, comprising an adaptor which can be screwed into the locking pin and which provides an adequate securing point for a slide hammer to enable removal of the locking pin.

SUMMARY OF THE INVENTION

A slide hammer is a very unsatisfactory way of removing the locking pin. It applies a shock load, which is inherently undesirable. It is physically large, noisy, heavy and requires significant physical exertion to operate. Furthermore, slide hammers cannot be easily transported, and cannot be included onboard the vehicle as they occupy too much space and impose too great a weight penalty. In some scenarios this could lead to a vehicle with a defective or damaged tyre requiring recovery to a specialist repairer, causing inconvenience to the end user where a roadside repair may have been possible.

The present invention therefore proposes to remove the locking element from a centre-lock wheel hub with a wheel nut threadingly engaged with the wheel hub, where the locking element engages with the wheel hub and with the wheel nut thereby to prevent relative rotation of the wheel hub and the wheel nut, by fitting an extraction apparatus having a first end with an externally threaded section, threadingly engaged with a corresponding internal thread of the locking element, a second end provided with an engagement element for imparting rotational torque to the extraction apparatus, and a bearing surface, located radially outside the externally threaded section and axially displaced from the externally threaded section, contacting the wheel nut.

Once this assembly has been completed by fitting the extraction apparatus to the locking element in the manner defined, the extraction apparatus can be rotated via the engagement element, thus drawing the locking element onto the threaded engagement. The extraction apparatus will be prevented from being drawn inwards as soon as the bearing surface comes into contact with the wheel nut. Thus, the locking element will be steadily withdrawn from the hub in a controlled manner.

The locking element typically comprises at least one spline corresponding to a spline on the wheel hub and/or the wheel nut. Often, there is a spline to engage with the wheel hub and a separate spline to engage with the wheel nut.

We prefer that the axial extent of the threaded engagement between the extraction tool and the locking element is at least as long as the axial extent of the engagement between the locking element and the wheel hub and/or the wheel nut. This ensures that the locking element can be completely removed.

The bearing face contacting the wheel nut can comprise an axially-concentric circular trench, into which an outer edge of the wheel nut is able to project. This provides a secure location for the bearing face. It is preferably located axially between the externally threaded section and the engagement element.

There will of course usually be a wheel mounted on the wheel hub, retained in place by at least the wheel nut.

Removal will be easier if the engagement element projects axially outwardly of the wheel nut; a wider variety of tools will then conveniently engage with the engagement element.

The extraction apparatus is preferably provided as two parts, an extraction tool on which the externally threaded section and the engagement element are provided, and a spacer tool on which the bearing surface is provided. The spacer tool can be an annular element of suitable dimensions.

The engagement element is preferably a recess having limited rotational symmetry, such as a square cross-section.

The present invention also relates to an extraction apparatus for a locking element of a centre-lock wheel hub assembly, having a first end with an externally threaded section, for engagement with a corresponding internal thread of the locking element, a second end provided with an engagement element for imparting rotational torque to the apparatus, a bearing surface for contacting the wheel nut, located radially outside the externally threaded section and axially displaced from the externally threaded section Finally, the invention provides a method of removing a wheel from a centre-lock wheel hub assembly, the hub assembly comprising a wheel nut threadingly engaged with the wheel hub and a locking element engaging with the wheel hub and with the wheel nut thereby to prevent relative rotation of the wheel hub and the wheel nut, the method comprising the steps of providing an extraction tool that is threadingly engagable with the locking element, providing a spacer tool having a bearing face for contacting the wheel nut and a bearing face for contacting the extraction tool thereby to maintain a minimum axial distance between them, threadingly engaging the extraction tool with the locking element with the spacer tool positioned between the wheel nut and the extraction tool, rotating the extraction tool thereby to continue threading engagement with the locking element and hence relative axial translation of the locking element and the extraction tool.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
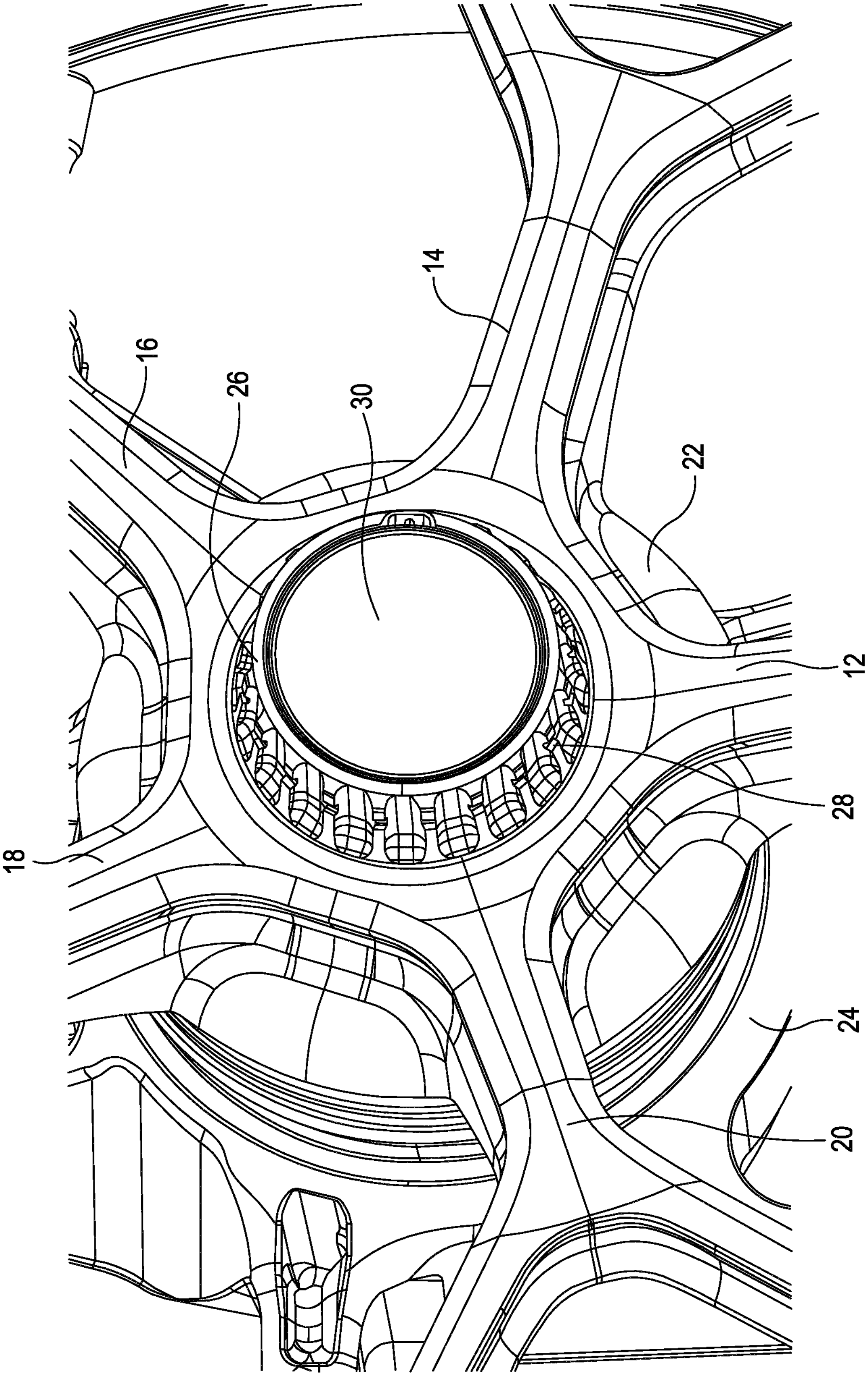
FIG. 1 shows the central area of a vehicle wheel with a centre-lock hub.

FIG. 1 shows the central part of a vehicle wheel employing a centre-lock wheel nut. The wheel 10 has five spokes 12, 14, 16, 18, 20 which emanate from a central boss 22 which is fitted to a wheel hub assembly 24 which forms part of the vehicle. In the conventional manner, the hub assembly 24 may incorporate drive shafts to provide motive torque to the wheels, bearings to allow the rotating wheel 10 and hub 24 parts to be carried on the vehicle suspension, mounting points for brake components such as a brake disc, brake callipers and the like, and (usually on a front hub) attachment points for steering components allowing the hub 24 and wheel 10 to be rotated around a substantially (but usually not perfectly) vertical axis to allow the vehicle to be steered. The wheel 10 is retained in place on the hub 24 by a wheelnut 26 which engages with a stub axle (not visible in FIG. 1) on the wheel hub 24, to urge the boss 22 against the hub 24. The boss 22 is shaped to fit snugly around the stub axle so that the wheel is held securely in place, and the wheelnut 26 threadingly engages with the stub axle. The external circumference 28 of the wheelnut 26 is knurled to allow a suitably-shaped socket to engage with the wheelnut 26 and rotate it in order to remove it from the stub axle. The wheelnut 26 is hollow (with a cylindrical morphology) to reduce weight and allow insertion of the locking pin (to be described), and the hollow central part is covered in use with a trim element 30 in order to provide an aesthetically acceptable external appearance and to keep the internal parts of the wheel hub assembly clean during use of the vehicle.

This structure lends itself to a straightforward set of reference axes. In the following, an "axial" direction is one that is in line with the axis of rotation of the wheel 10 on the hub 24. The "in" and "out" directions along that axis are towards the centreline of the vehicle and away from the centreline of the vehicle, respectively.

Figure 2:
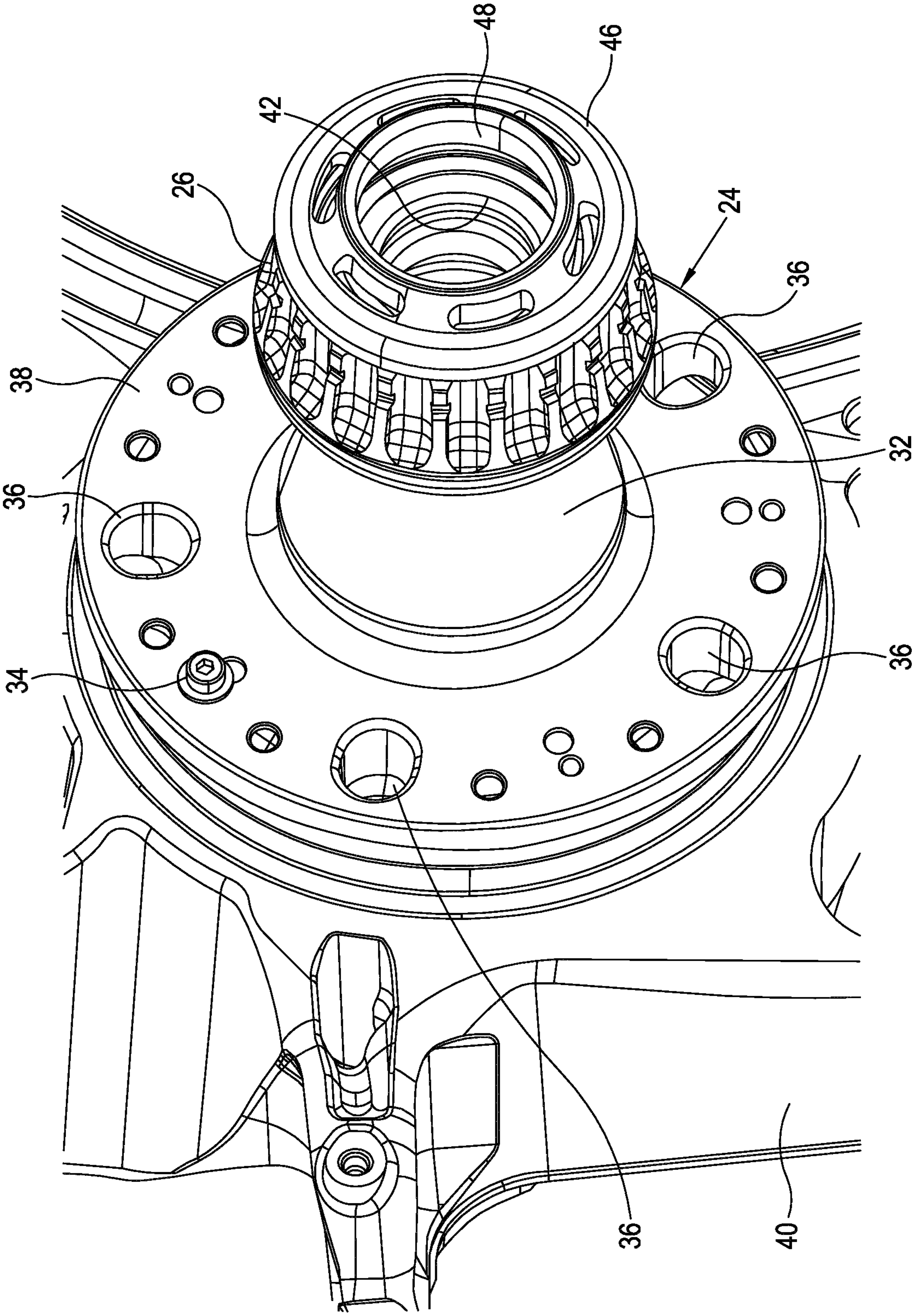
FIG. 2 shows the centre-lock hub of FIG. 1 with the removal tool of the present invention fitted.
Figure 3:
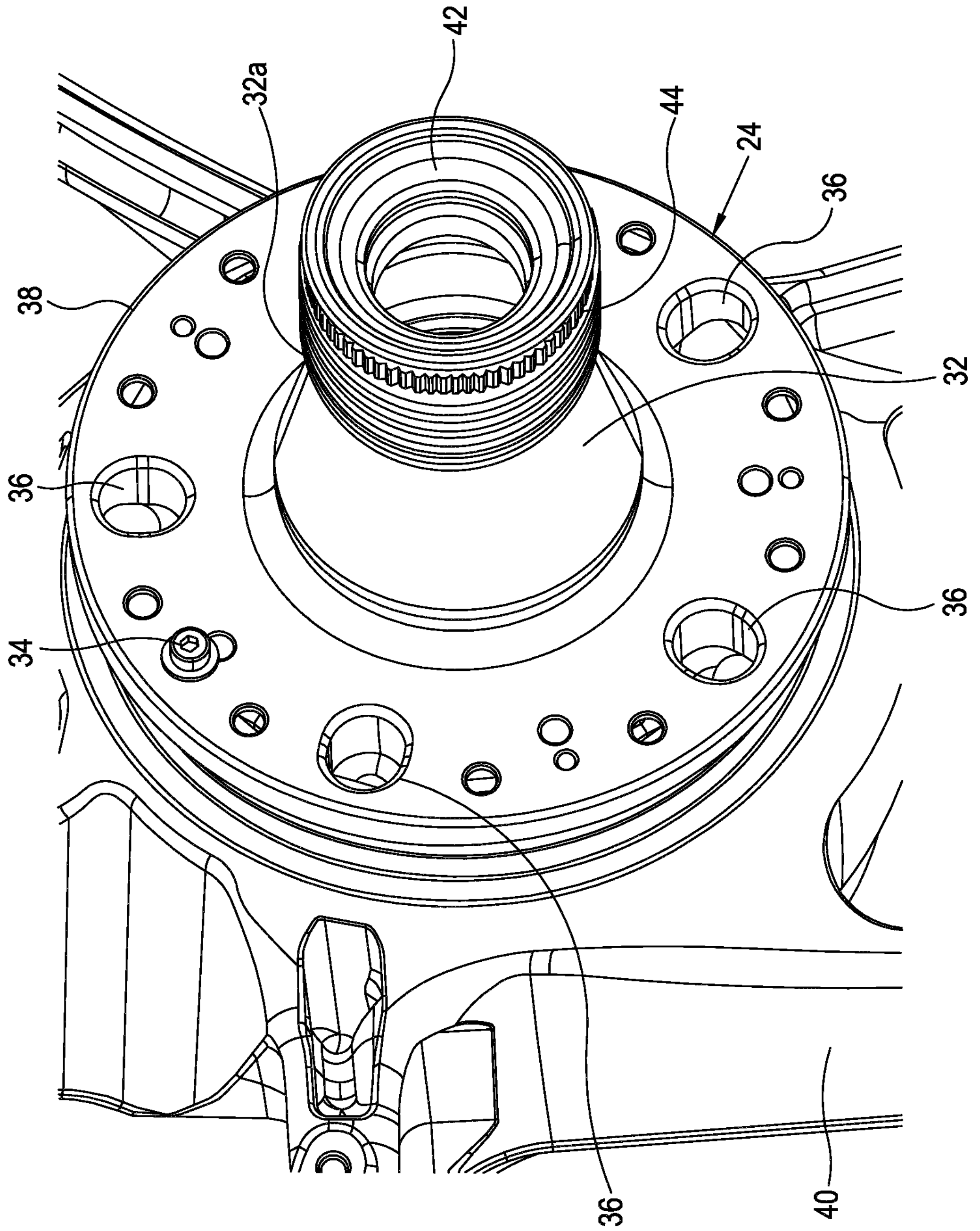
FIG. 3 shows the centre-lock hub of FIG. 2 with all removal tools for the locking pin fitted.
Figure 4:
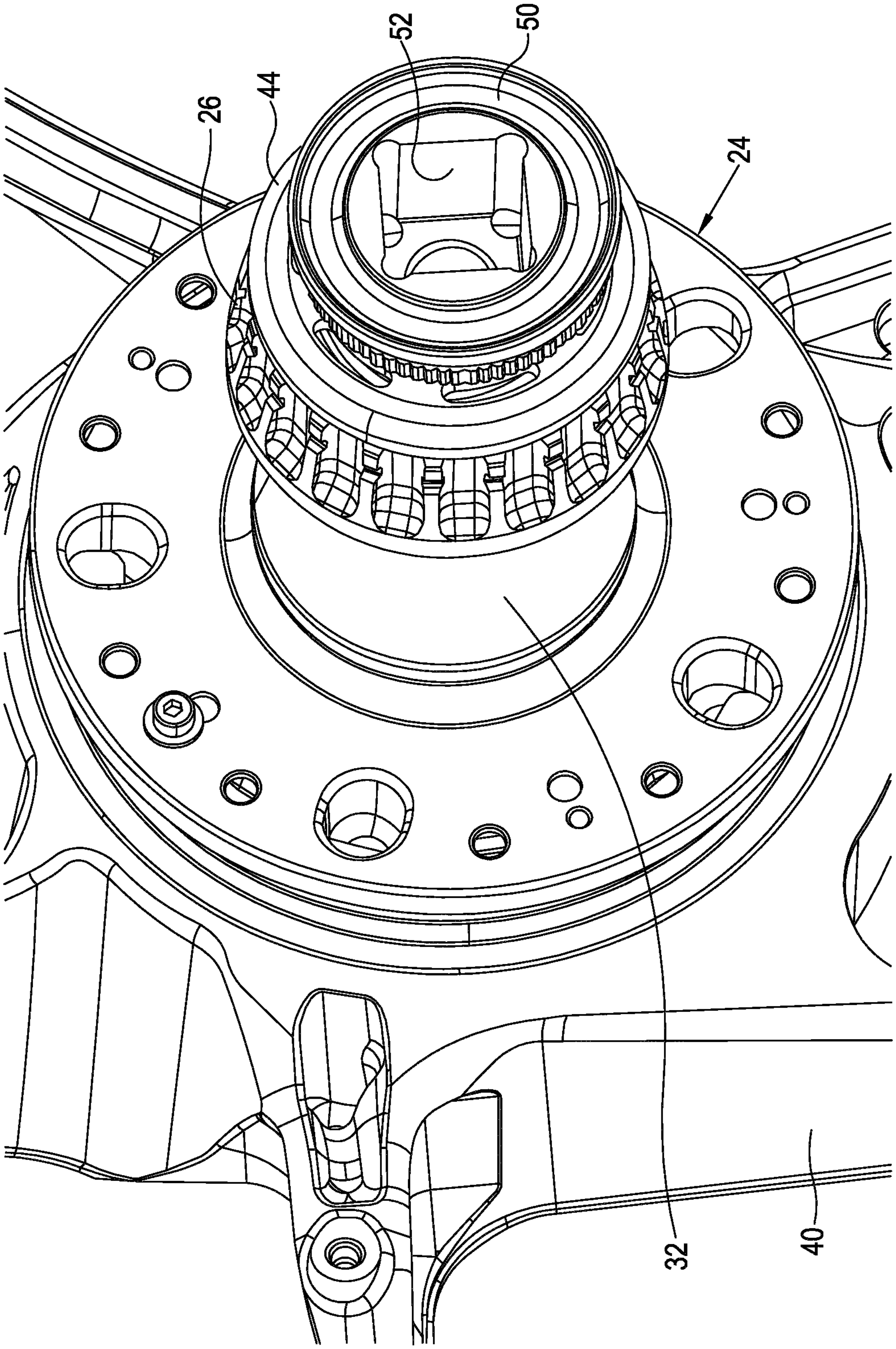
FIG. 4 shows the wheel hub of FIG. 1 with the wheel nut absent, for illustrative purposes.

FIGS. 2 and 3 show the arrangement of FIG. 1 but with the wheel 10 absent (FIG. 2) and also the wheelnut 26 absent (FIG. 3). This would obviously be an unusual arrangement in practice, with the wheelnut 26 fitted to the stub axle 32 on the hub 24 but without the wheel 10 being present. However, it is useful for illustrating the constructional details involved. Thus, the hub 24 can be seen to have a fixing point 34 for retaining a brake disc (also absent in FIG. 2) in place during wheel changes, and recesses 36 for receiving protrusions on the interior face of the wheel boss 22 which pass through corresponding apertures in the brake disc and extend into the recesses 36. In this way, relative rotation of the wheel 10, hub 24 and brake disc is prevented. These are provided on a rotatable part 38 of the hub 24 which is carried on bearings (not visible) within the remainder 40 of the hub assembly 24 that is attached to the vehicle suspension.

The stub axle 32 is in the form of a hollow cylindrical projection from the rotatable part 38 of the hub 24. An end portion of the stub axle is externally-threaded 32*a* so as to accept the wheelnut 26 which has a corresponding internal thread. Also visible in FIGS. 2 & 3, normally concealed beneath the trim element 30, is the locking pin 42. This is an annular element which locates within the central hollow space of the stub axle 32 and which has external spline formations 44 which match corresponding internal spline formations on the stub axle 32 and the wheelnut 26. Thus, once inserted axially inwardly, the splines engage and the locking pin thus bridges from the stub axle 32 to the wheelnut 26 to prevent relative rotation and keep the wheelnut 26 engaged on the stub axle 32.

It then remains to find a way to remove the locking pin 42 when it becomes necessary to remove the wheel 10 (and hence the wheelnut 26). To enable this, we provide a spacer tool 46, shown in FIG. 2, in the form of an annular disc which sits axially on the wheelnut 26. On its inner face there is a bearing surface which contacts the wheelnut 26, shaped so as to minimise wear of the wheelnut 26. The annular disc shape of the spacer tool 46 defines a central hole 48, through which can extend an engagement tool 50. This has an external thread which can engage with a corresponding internal thread on the locking pin 42, and an externally-accessible engagement element 52 which (in this example) is a square-section recess able to receive standard-sized ratchet tools, breaker bars and the like. Engagement tools 50 of this type are commonly used to thread into the locking pin 42 in order to provide a secure attachment point for a slide hammer or the like which is able to forcibly remove the locking pin 42.

Figure 5:
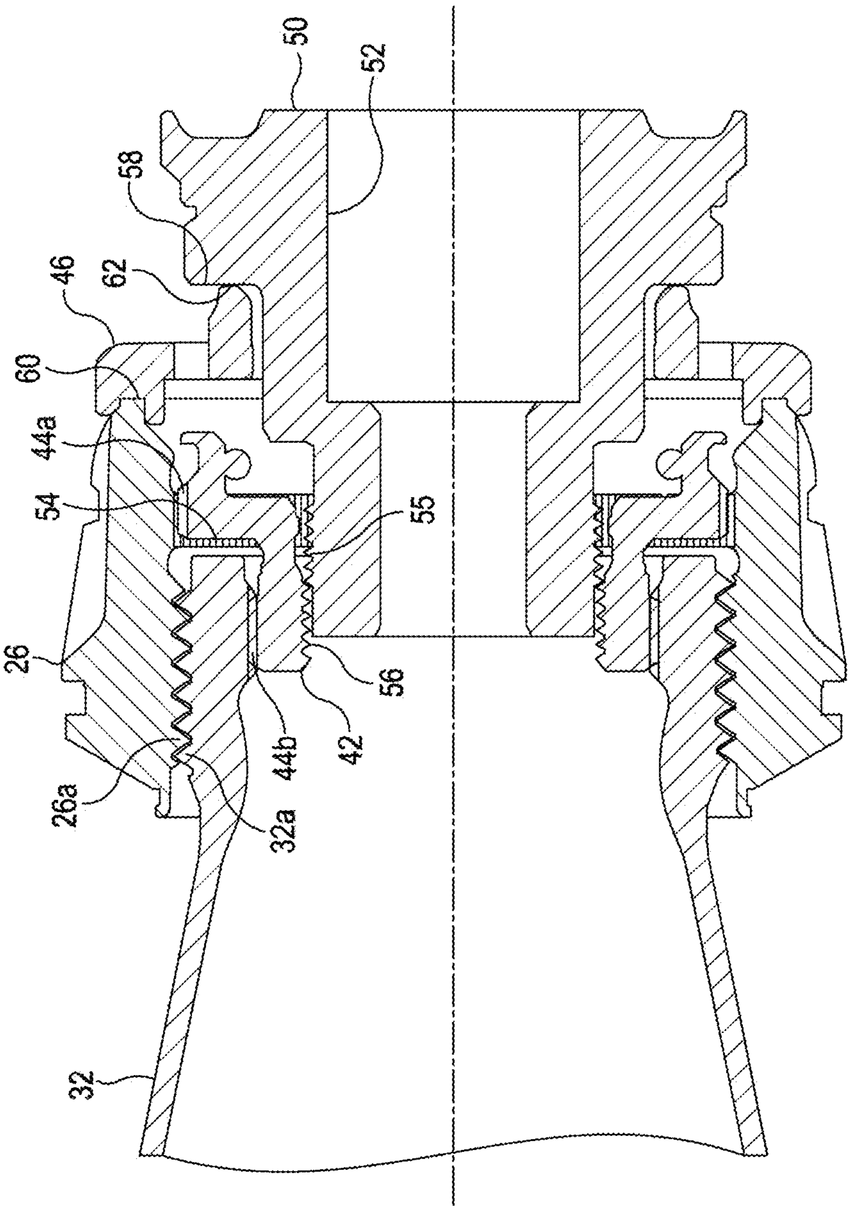
FIG. 5 shows a sectional view through the wheel hub immediately prior to removal of the locking pin.
Figure 6:
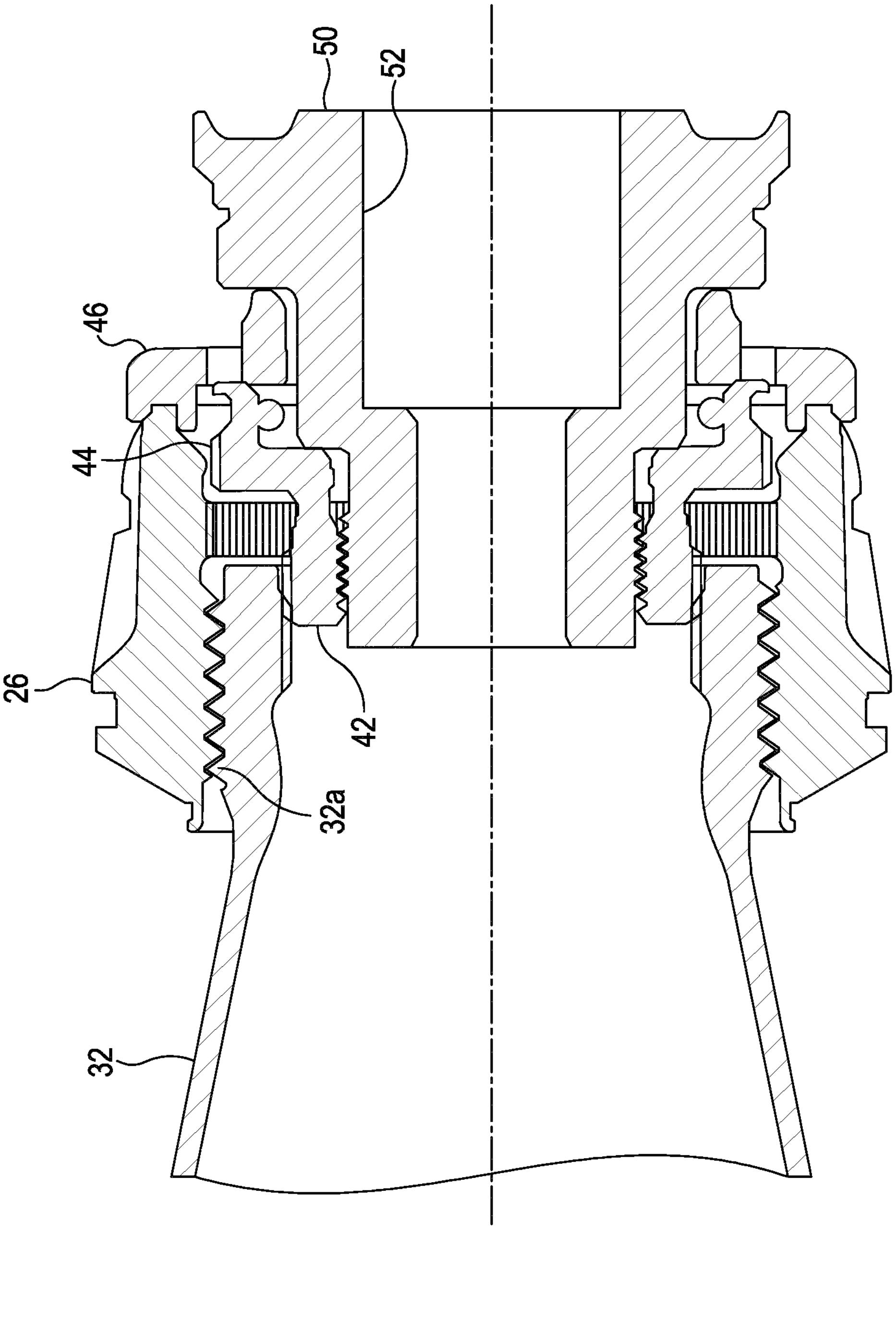
FIG. 6 shows a sectional view through the wheel hub during removal of the locking pin.
Figure 8:
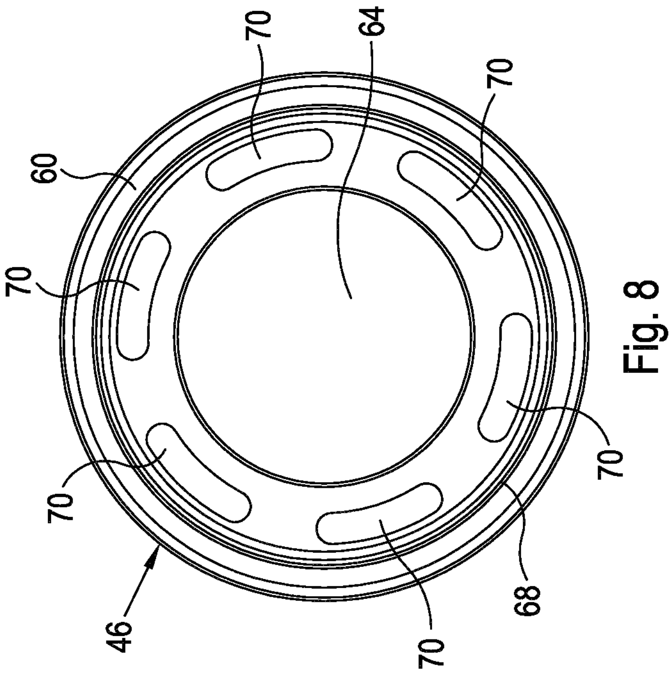
FIGS. 7, 8, 9 and 10 show iso, underside, side and sectional views (respectively) through the removal tool of the present invention.
Figure 10:
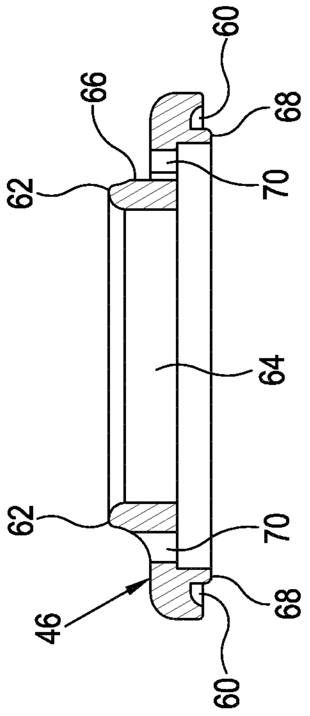
Figure 7:
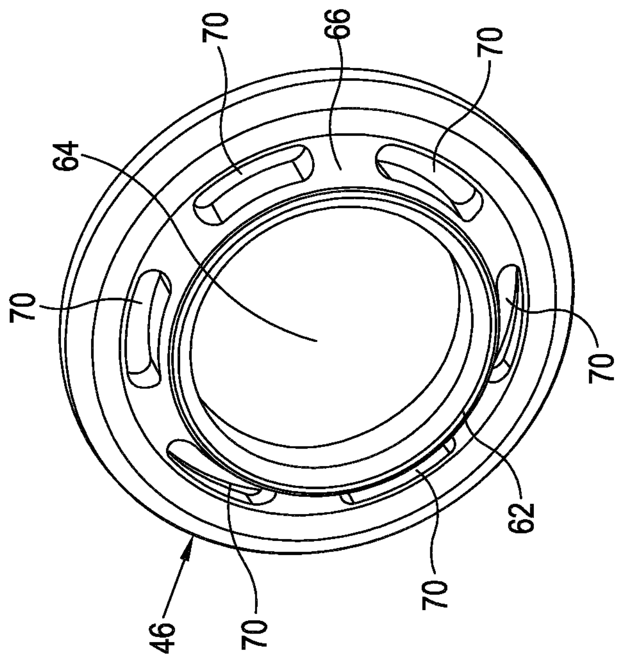
Figure 9:
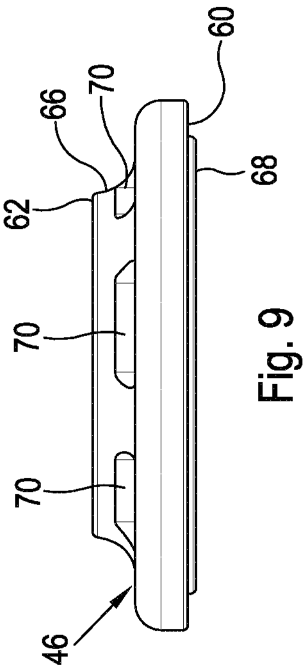

Instead of removing the locking pin 42 via a shock loading imparted via a slide hammer, FIGS. 5 and 6 show how the locking pin 42 can be removed more easily and with less likelihood of damage. With the assembly shown in section at the point where extraction of the locking pin 42 is ready to commence, the wheelnut 26 is fitted on the stub axle 32, the internal thread 26*a* of the wheelnut 26 engaging tightly with the external thread 32*a* of the stub axle 32. The locking pin 42 is in place within the annular interior space defined by the hollow stub axle 32 and the wheelnut 26, external splines 44*a* and 44*b* engaging with corresponding internal splines on the stub axle 32 and wheelnut 26. Note that, in this example, the two splines 44*a* and 44*b* are different in size, with a step 54 between them, so that the spline 44*b* which engages with the stub axle 32 is narrower than the spline 44*a* which engages with the wheelnut 26. However, this need not necessarily be the case and other arrangements are possible which employ a single external spline on the locking pin which extends through matching internal splines on the stub axle and wheelnut.

The engagement tool 50 extends into the central axis of the locking pin 42 and has an external thread 55 which has just about engaged with an internal thread 56 on an inner cylindrical surface of the locking pin 42. Towards the outer part of the engagement tool 50, the tool widens including a step 58 which defines a bearing surface, behind with is sandwiched the spacer tool 46.

As noted above, the spacer tool 46 is in the form of a disc having an inner bearing surface 60 which contacts the outer extremity of the wheelnut 26 and an outer bearing surface 62 which contacts the step 58. With the thread 55 of the engagement tool 50 satisfactorily but not fully engaged, the spacer tool 46 is snugly sandwiched in place. To achieve this, the spacer tool is dimensioned appropriately in the light of the dimensions of the other elements illustrated in FIG. 5.

Once in this configuration, a source of torque can be connected to the engagement element 52 of the engagement tool 50, such as a ratchet spanner, breaker bar, air gun or the like. Rotation of the engagement tool 50 then further engages its thread 54 with the thread 56 of the locking pin 42. Since the engagement tool 50 cannot be drawn further into the assembly, due to the presence of the spacer tool 46 abutting against the wheelnut 26 and the step 58, the locking pin 42 must instead be withdrawn from the stub axle 32 and wheelnut 26. FIG. 6 shows the arrangement after further rotation, with the locking pin 42 withdrawn sufficient to completely disengage the spline 44*a* with the wheelnut 26 and almost disengage the spline 44*b* with the stub axle 32. At this point, the locking pin 42 should be relatively free and easy to remove simply by pulling on the engagement tool 50.

Importantly, the locking pin 42 is removed in the way by a steady draw created by the threaded engagement with the engagement tool 50. The degree of leverage involved can be tailored as desired by setting pitch of the thread employed. Sudden shock loads are avoided entirely.

Another benefit of this invention is that a simple, inexpensive and lightweight spacer tool 46 can be provided that enables a standard engagement tool 50 to be employed within the process, simply by selecting the dimensions of the spacer tool as required in the light of the dimensions of a standard engagement tool 50 and the other elements of the wheel hub, nut etc. Such engagement tools are provided to workshops and recovery staff, and may be incorporated within the toolkit provided in the vehicle. The spacer tool is small enough and light enough to be provided in the vehicle toolkit and will therefore always be available should the vehicle become stranded with a damaged tyre, for example.

The spacer tool 46 could be provided in the manner shown, i.e. a separate disc which cooperates with the engagement tool 50. Alternatively, the spacer tool 46 could be retained on the engagement tool 50 as a permanent or semi-permanent part thereof. Such a combined spacer tool and engagement tool could be an integral body, or the spacer tool could be freely rotatable around the engagement tool. We generally prefer the latter, since this allows the spacer tool to remain still relative to the wheelnut and thus prevent wear or similar damage to the wheelnut.

FIGS. 7 to 10 show the spacer tool 46 in greater detail. Generally in the form of an annular disc, the spacer tool 46 therefore has a central aperture 64 around which the profiled disc extends circumferentially. On its outermost or top face there is a protruding lip 66 immediately around the central aperture 64, the tip of which defines the outer bearing surface 62 against which the step 58 of the engagement tool 50 abuts in use in order to brace the engagement tool 50 against further inward movement. On the innermost face or underside of the spacer tool 46 there is an circumferential recess extending around the disc, proximate its radially outer edge. This defines the inner bearing surface 60 against which the outer extremity of the wheelnut 26 abuts in use in order to brace the spacer tool 46 against further inward movement.

The inner bearing surface 60 is defined in the form of a circumferential recess in order to allow the spacer tool 46 to rest snugly against the outermost tip of the wheelnut 26, with the spacer tool 46 locating itself accurately on the wheel hub axis when the tip of the wheelnut 26 fits into the circumferential recess. To assist with this positive location, the radially inner edge of the recess is defined by an upstanding ridge 68 extending circumferentially around the disc, which can (in use) fit snugly within the wheelnut 26.

The inner bearing surface 60 and outer bearing surface 62 are spaced apart axially by a distance which is small enough to allow the respective threads of the locking pin 42 and the engagement tool 50 to engage but large enough to allow the locking pin 42 to be fully withdrawn.

In the portion of the disc lying radially between the inner bearing surface 60 and the outer bearing surface 62, a plurality of weight-saving through-holes are provided. These are circumferentially spaced and sized to leave behind sufficient material to lend adequate strength to the spacer tool 46 while eliminating as much weight as possible. This assists with allowing the spacer tool 46 to be carried in the toolkit of a lightweight sports car.

It will of course be understood that many variations may be made to the above-described embodiment without departing from the scope of the present invention.

The invention claimed is:

1. An assembly comprising:

a centre-lock wheel hub, a wheel nut threadingly engaged with the wheel hub, a locking element engaging with the wheel hub and with the wheel nut thereby to prevent relative rotation of the wheel hub and the wheel nut, an extraction apparatus having;

a first end with an externally threaded section, threadingly engaged with a corresponding internal thread of the locking element;

a second end provided with an engagement element for imparting rotational torque to the extraction apparatus;

a bearing surface, located radially outside the externally threaded section and axially displaced from the externally threaded section, contacting the wheel nut.

2. The assembly according to claim 1 in which the locking element comprises at least one spline corresponding to a spline on the wheel hub and/or the wheel nut.

3. The assembly according to claim 1 in which the axial extent of the threaded engagement between the extraction tool and the locking element is at least as long as the axial extent of the engagement between the locking element and the wheel hub and/or the wheel nut.

4. The assembly according to claim 1, wherein the bearing surface contacting the wheel nut comprises an axially-concentric circular trench into which an outer edge of the wheel nut is able to project.

5. The assembly according to claim 1, further comprising a wheel mounted on the wheel hub and retained in place by at least the wheel nut.

6. The assembly according to claim 1, wherein the engagement element projects axially outwardly of the wheel nut to assist with removal.

7. The assembly according to claim 1 in which the bearing surface is located axially between the externally threaded section and the engagement element.

8. The assembly according to claim 1, wherein the extraction apparatus is provided as two parts, being an extraction tool on which the externally threaded section and the engagement element are provided, and a spacer tool on which the bearing surface is provided.

9. The assembly according to claim 8 in which the spacer tool is annular.

10. The assembly according to claim 1 in which the engagement element is a recess having limited rotational symmetry.

11. The assembly according to claim 10 in which the recess has a square cross-section.

12. An extraction apparatus for a locking element of a centre-lock wheel hub assembly, having;

a first end with an externally threaded section, for engagement with a corresponding internal thread of the locking element;

a second end provided with an engagement element for imparting rotational torque to the apparatus;

a bearing surface for contacting a wheel nut, the bearing surface being located radially outside the externally threaded section and axially displaced from the externally threaded section.

13. The extraction apparatus according to claim 12 in which the engagement element is a recess having limited rotational symmetry.

14. The extraction apparatus according to claim 13 in which the recess has a square cross-section.

15. The extraction apparatus according to claim 12 in which the bearing surface is located axially between the externally threaded section and the engagement element.

16. The extraction apparatus according to claim 12, provided as two parts being an extraction tool on which the externally threaded section is provided and the engagement element, and a spacer tool on which the bearing surface is provided.

17. A method of removing a wheel from a centre-lock wheel hub assembly, the hub assembly comprising a wheel nut threadingly engaged with the wheel hub and a locking element engaging with the wheel hub and with the wheel nut thereby to prevent relative rotation of the wheel hub and the wheel nut, the method comprising the steps of:

providing an extraction tool that is threadingly engageable with the locking element, providing a spacer tool having a bearing face for contacting the wheel nut and a bearing face for contacting the extraction tool thereby to maintain a minimum axial distance between them, threadingly engaging the extraction tool with the locking element with the spacer tool positioned between the wheel nut and the extraction tool, rotating the extraction tool thereby to continue threading engagement with the locking element and hence relative axial translation of the locking element and the extraction tool.

* * * * *